(12) United States Patent
York

(10) Patent No.: US 10,665,095 B2
(45) Date of Patent: May 26, 2020

(54) PEDESTRIAN SAFETY LIGHTING DEVICE AND SYSTEM

(71) Applicant: Robert York, Los Angeles, CA (US)

(72) Inventor: Robert York, Los Angeles, CA (US)

( * ) Notice: Subject to any disclaimer, the term of this patent is extended or adjusted under 35 U.S.C. 154(b) by 0 days.

(21) Appl. No.: 16/117,816

(22) Filed: Aug. 30, 2018

(65) Prior Publication Data
US 2020/0074846 A1 Mar. 5, 2020

(51) Int. Cl.
G08G 1/005 (2006.01)
H04N 7/18 (2006.01)

(52) U.S. Cl.
CPC ............. *G08G 1/005* (2013.01); *H04N 7/181* (2013.01)

(58) Field of Classification Search
CPC ................................ G08G 1/005; E01F 9/615
USPC .......................................................... 340/944
See application file for complete search history.

(56) References Cited

U.S. PATENT DOCUMENTS

| 5,734,339 A * | 3/1998 | Ogle ...................... G08G 1/005 116/63 R |
| 2005/0231381 A1* | 10/2005 | Pederson ............. B60Q 1/2611 340/815.45 |
| 2008/0297020 A1* | 12/2008 | Wanninger ......... G02B 27/0927 313/110 |
| 2009/0256723 A1* | 10/2009 | Peddie ............. G08G 1/096783 340/907 |
| 2014/0299907 A1* | 10/2014 | Lu ........................ C08K 5/5317 257/98 |
| 2017/0205037 A1* | 7/2017 | Oostdyk ............... F21V 29/505 |

* cited by examiner

Primary Examiner — Fabricio R Murillo Garcia
(74) Attorney, Agent, or Firm — Omni Legal Group; Omid E. Khalifeh

(57) ABSTRACT

A pedestrian safety lighting device and system configured to mount to and be used in connection with existing traffic signals and intersections and increase awareness of pedestrians and vehicles of one another on a roadway is provided. In some embodiments, the pedestrian safety lighting device and system comprises a housing, at least one light source, a communication means, and a power source. More specifically, the communication means is configured to receive external data from the same or a different traffic signal, selectively illuminate the light source, and generate and transmit internal data to the same or a different traffic signal, or a data center. In further embodiments, the device and system may also comprise a light directing element, a light processing element, one or more sensors, a speaker, a camera, and a microphone.

17 Claims, 16 Drawing Sheets

PEDESTRIAN SAFETY LIGHTING DEVICE AND SYSTEM

GOVERNMENT CONTRACT

Not applicable.

CROSS-REFERENCE TO RELATED APPLICATIONS

Not applicable.

STATEMENT RE. FEDERALLY SPONSORED RESEARCH/DEVELOPMENT

Not applicable.

COPYRIGHT & TRADEMARK NOTICES

A portion of the disclosure of this patent document may contain material which is subject to copyright protection. This patent document may show and/or describe matter which is or may become trade dress of the owner. The copyright and trade dress owner has no objection to the facsimile reproduction by any one of the patent document or the patent disclosure, as it appears in the Patent and Trademark Office patent files or records, but otherwise reserves all copyrights and trade dress rights whatsoever.

TECHNICAL FIELD

The disclosed subject matter relates generally to vehicular intersection lighting devices and systems and, more particularly, to a device and system for pedestrian safety lighting configured to mount to and be used in connection with existing traffic signals and increase awareness of pedestrians and vehicles of one another on a roadway.

BACKGROUND

Vehicular traffic control often combines visual traffic signals with visual and sometimes auditory or haptic pedestrian signals to indicate to pedestrians a safe time to cross a roadway. Moreover, improvements in vehicle safety have included the introduction of automatic emergency braking systems, automatic steering systems, rearview and surround view cameras, and collision-alert technology. Despite these implementations, pedestrian injuries and fatalities continue to increase, especially in recent years, and represent a large cost to society. Indeed, pedestrian fatalities increased 27% from 2007 to 2016 in the United States. Clearly, there exists a need to improve pedestrian safety.

Most pedestrian fatalities occur during dusk and evening hours, when lighting conditions are poor. According to the Governors Highway Safety Association, 75% of pedestrian fatalities occur during nighttime hours and 2% during dusk. Many deaths occur as a result of the driver not noticing the pedestrian and therefore, having insufficient time to stop to avoid striking the pedestrian. Per a federal crash data study, a pedestrian's likelihood of survival approximates 90% if struck by a vehicle traveling at 20 miles per hour but is diminished to 20% if the vehicle is moving at 40 miles per hour. As a result, there exists a need to improve visibility of pedestrians crossing roadways during naturally low-light conditions.

Thus far, many proposed solutions to the problem of pedestrian visibility have related to providing ground-level, and even in-ground, crosswalk lighting. For instance, U.S. Pat. No. 6,384,742 discloses a plurality of surface-mounted lights that, when activated by a manual switch or sensor, flash along the ground surrounding a pedestrian crosswalk to warn drivers that a pedestrian may have entered the crosswalk and that caution should be exercised. Similarly, Korean patent application 20130083285 discloses a crosswalk safety system including pedestrian guidance indicators as in-ground LED light strips. The light strips provide a visual indicator that pedestrians may safely cross the intersection.

Other proposed solutions relate to above-ground crosswalk lighting. For instance, Korean patent 10127551 teaches a lighting apparatus for pedestrian crossing zone which radiates across a crosswalk to increase visibility of pedestrians. However, this reference does not provide a light frame that may be fixed to an existing traffic signal. Also, this patent does not provide for coordinating the illumination of the device with natural lighting or weather conditions. U.S Pub. Nos. 2017/0038018, 2017/0030538, and 2016/0123547 related to bollard type lighting fixtures that automatically illuminate a pedestrian crosswalk when vehicles and pedestrians are detected. These do not, however, disclose retrofittable use with existing traffic signals but rather operate as a function of the presence of vehicles and pedestrians. Additionally, these lighting figures are not activatable in low-visibility daytime conditions.

SUMMARY

The present disclosure is directed to pedestrian safety lighting devices and systems which are designed to receive data from traffic signals and data centers and illuminate a crosswalk or an intersection.

For purposes of summarizing, certain aspects, advantages, and novel features have been described. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested.

In accordance with one embodiment, the pedestrian safety lighting device and system may comprise a housing configured to securably mount to or suspend from a traffic signal. It is to be understood that in other embodiments, the housing may be configured as a stand-alone structure. The housing may be further defined peripherally by a first edge, a second edge, a third edge, and a fourth edge and may have an exterior surface and an interior surface. The interior surface and each of the first, second, third, and fourth edges define an interior cavity of the housing. The interior cavity may be formed to support at least one light source, a communication means, and a power source.

The light source disposed along the interior surface of the housing. In some exemplary embodiments, the light source is a plurality of light emitting diodes (LEDs). In other embodiments, the light source may be one or more metal halides, ultra-high performance bulbs, red, green, and blue LEDs, fluorescent bulbs, incandescent bulbs, halogen bulbs, or laser diodes. One of ordinary skill in the art will recognize that any various types of light sources available in the marketplace may be adapted to provide illumination according to this disclosure.

Each light source may be coupled to a light directing element so as to redirect light produced by the light source toward the direction of the crosswalk, intersection, or a portion thereof, as desired. The light directing element may comprise a reflector disposed along the interior surface of the housing. In other embodiments, the light directing element may comprise a light guide. The light directing element may be adjusted so as to redirect illumination from the light source as desired.

The pedestrian safety lighting device and system may further comprise a light processing element. In certain exemplary embodiments, the light processing element may comprise a liquid crystal display screen. In other embodiments, the light processing element may comprise a spinning mirror carousel or virtually any other type of internal image processor known to those skilled in the art. A person of ordinary skill in the art will understand various types of light processing elements are possible and that the particular type implemented will vary in accordance with the type of light source.

According to certain embodiments, the communication means may enable the pedestrian safety lighting device and system to communicate with at least one external source. In particular, in embodiments wherein the external source may comprise a traffic signal, the communication means may be operative to receive external data from the traffic signal and generate and transmit internal data to the same or a different traffic signal. In some embodiments, the external source may comprise a data center, to and from which the communication means may receive and transmit external data. In such embodiments, the communication means may receive external data in the form of advertisements from the data center. As another example, the communication means may transmit internal data relating to an emergency situation to the data center. In yet other embodiments, the external source may comprise a smartphone, which may be carried by a pedestrian while crossing a crosswalk. The communication means may further be operative to compare historical internal data and evaluate internal data and external data to selectively illuminate the light source. The communication means may comprise near-field communications, microwave links, Bluetooth, IEEE 802.11 wireless communications, or cellular communications such as Global System for Mobile Communications (GSM). In further embodiments, the communication means may comprise wired communications.

The pedestrian safety lighting device and system may also comprise the power source, as noted above. The power source may be configured to electrically couple the light source to an external power supply. In some embodiments, the power source may be disposed within the interior cavity while, in others, the power source may be placed outside the device.

In certain exemplary embodiments, the pedestrian safety lighting device and system may also comprise a proximity sensor. The proximity sensor may detect the presence and position of an object within its field of detection. For instance, the proximity sensor may comprise an ultrasonic sensor, a light detection and ranging (LIDAR) sensor, a passive infrared (PIR) sensor, infrared (IR) sensor, or radio frequency identification (RFID) technology. The device and system may comprise other sensors, such as an ambient lighting sensor or a weather sensor. The ambient lighting sensor may comprise a photoresistor operative to detect the presence or absence of light and to measure the light intensity. The weather sensor may detect and measure weather conditions such as temperature, precipitation, humidity, and barometric pressure.

In further exemplary embodiments, the pedestrian safety lighting device and system may further comprise one or more speakers configured to emit a noise. The one or more speakers may thereby provide awareness of pedestrian priority (or lack thereof). The auditory signal may comprise a siren, a bell, a chime, or other signal capable of emitting an audible sound. In some embodiments, the device and system may also comprise one or more cameras, which may be configured to record real time video. For instance, the cameras may capture images of pedestrians, vehicles, or license plates. Moreover, the cameras may be operative to capture an image upon a triggering event, such as a vehicle running a red light, amber alert tracking, or suspect vehicle tracking, hazardous roadway conditions.

Accordingly, it is an object of the present invention to provide a pedestrian safety lighting device and system adapted to increase awareness of pedestrians and vehicles of one another on a roadway. Another object of this invention is to increase traffic efficiency and reduce traffic fatalities. It is still another object of the invention to provide a pedestrian safety lighting device and system capable of communicating efficiently with traffic signals, vehicles, pedestrians, and data centers. Finally, it is yet another object of the invention to provide a pedestrian safety lighting device and system adapted for use in connection with existing traffic signals and intersections.

One or more of the above-disclosed embodiments, in addition to certain alternatives, are provided in further detail below with reference to the attached figures. The disclosed subject matter is not, however, limited to any particular embodiment disclosed.

Figure 1:
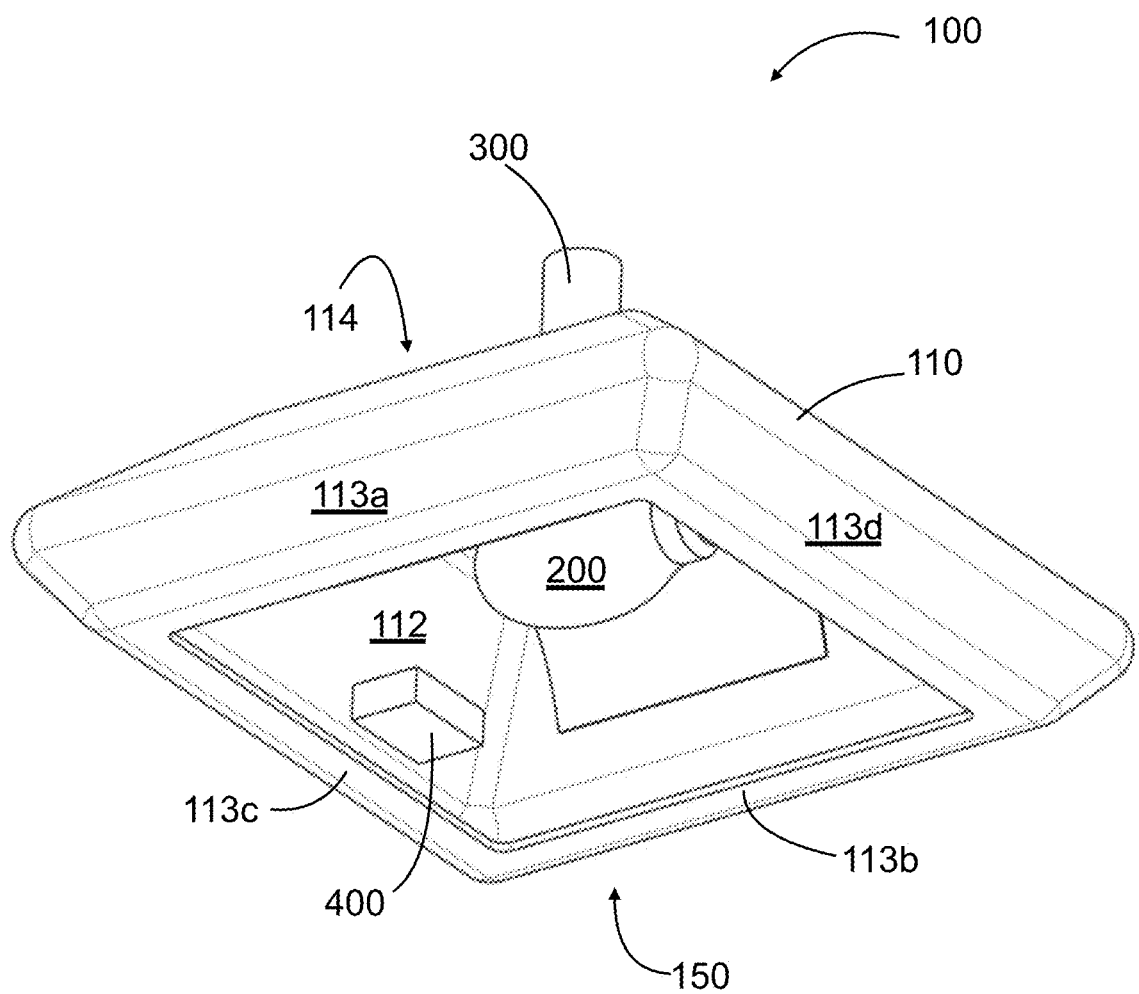
FIG. 1 shows a bottom perspective view of an embodiment of the pedestrian safety lighting device and system.

The disclosed embodiments may be better understood by referring to the figures in the attached drawings, as provided below. The attached figures are provided as non-limiting examples for providing an enabling description of the method and system claimed. Attention is called to the fact, however, that the appended drawings illustrate only typical embodiments of this invention and are therefore not to be considered as limiting of its scope. One skilled in the art will understand that the invention may be practiced without some of the details included in order to provide a thorough enabling description of such embodiments.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "couple," "coupled," "couples," "coupling," and the like should be broadly understood and refer to connecting two or more elements or signals, electrically, mechanically or otherwise. Two or more electrical elements may be electrically coupled, but not mechanically or otherwise coupled; two or more mechanical elements may be mechanically coupled, but not electrically or otherwise coupled; two or more electrical elements may be mechanically coupled, but not electrically or otherwise coupled. Coupling (whether mechanical, electrical, or otherwise) may be for any length of time, e.g., permanent or semi-permanent or only for an instant.

DETAILED DESCRIPTION

Having summarized various aspects of the present disclosure, reference will now be made in detail to that which is illustrated in the drawings. While the disclosure will be described in connection with these drawings, there is no intent to limit it to the embodiment or embodiments disclosed herein. Rather, the intent is to cover all alternatives, modifications and equivalents included within the spirit and scope of the disclosure as defined by the appended claims.

With reference to FIG. 1, one embodiment of a pedestrian safety lighting device 100 may comprise a housing 110 defined by an interior surface 112 and an opposing exterior surface 114. The housing 110 may contain at least one light source 200, a communication means 300, a power source 400, and other additional elements discussed in detail below in order to provide selective illumination of a crosswalk or traffic intersection. As on exemplary embodiment, a pedestrian safety lighting devices of a cuboidal shape featuring one light source is shown and described, however, it will be understood that various shapes and styles of pedestrian safety lighting devices may be adapted according to this disclosure to illuminate a crosswalk or intersection.

By way of example and not limitation, in some embodiments, the housing 110 may be peripherally defined by a plurality of edges, that is, a first edge 113a, a second edge 113b, a third edge 113c, and a fourth edge 113d. Together, the interior surface 112 and each of the first, second, third, and fourth edges 113a, 113b, 113c, 113d may define an interior cavity 150. The interior cavity 150 may be formed to support the light source 200, the communication means 300, and the power source 400.

Figure 2:
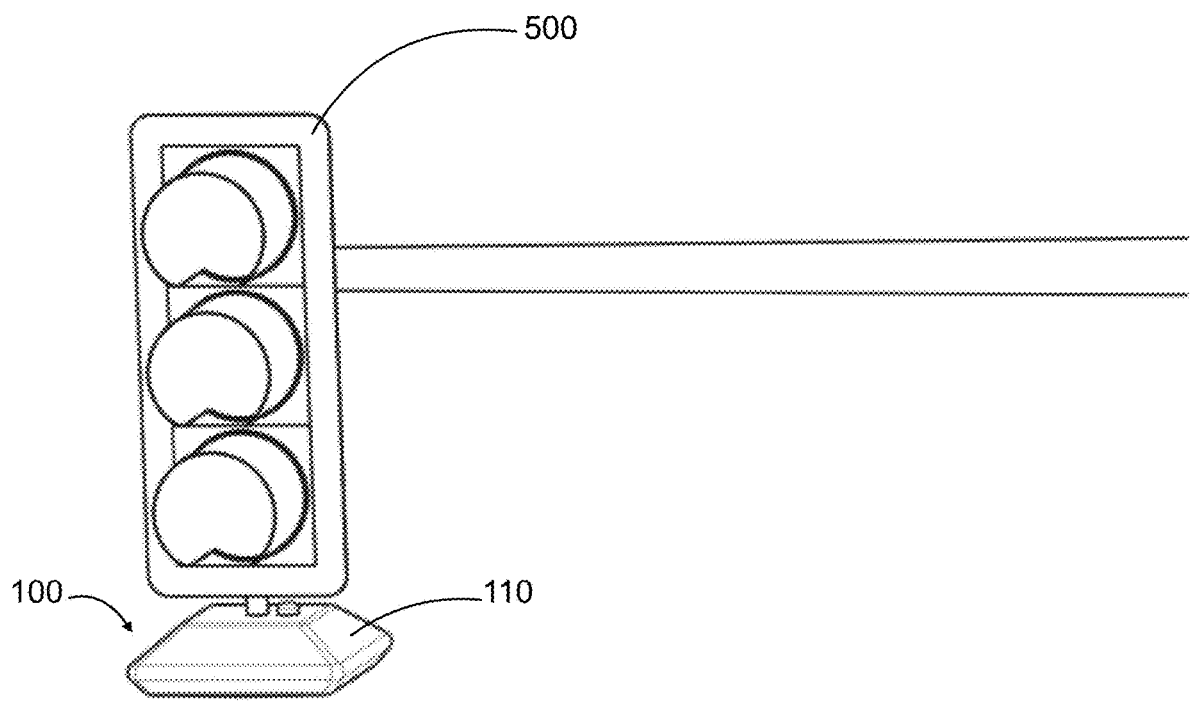
FIG. 2 shows a perspective view of an embodiment of the pedestrian safety lighting device and system as attached to an existing traffic signal.

An alternative view of the exemplary pedestrian safety lighting device 100 is shown in FIG. 2. The housing 110 may be configured to securably mount to or suspend from a traffic signal 500. The housing 110 may also be configured to securably mount to or suspend from other structures, such as street lamp post or traffic sign. In some embodiments, the housing 110 may have a connection fitting, such as a mounting bracket, hanger bar, tie-off, or support clip, that can attach the device 100 to a standard traffic signal 500. In yet another embodiment, the housing 110 may be configured as a stand-alone structure disposed adjacent to a roadway.

Figure 3:
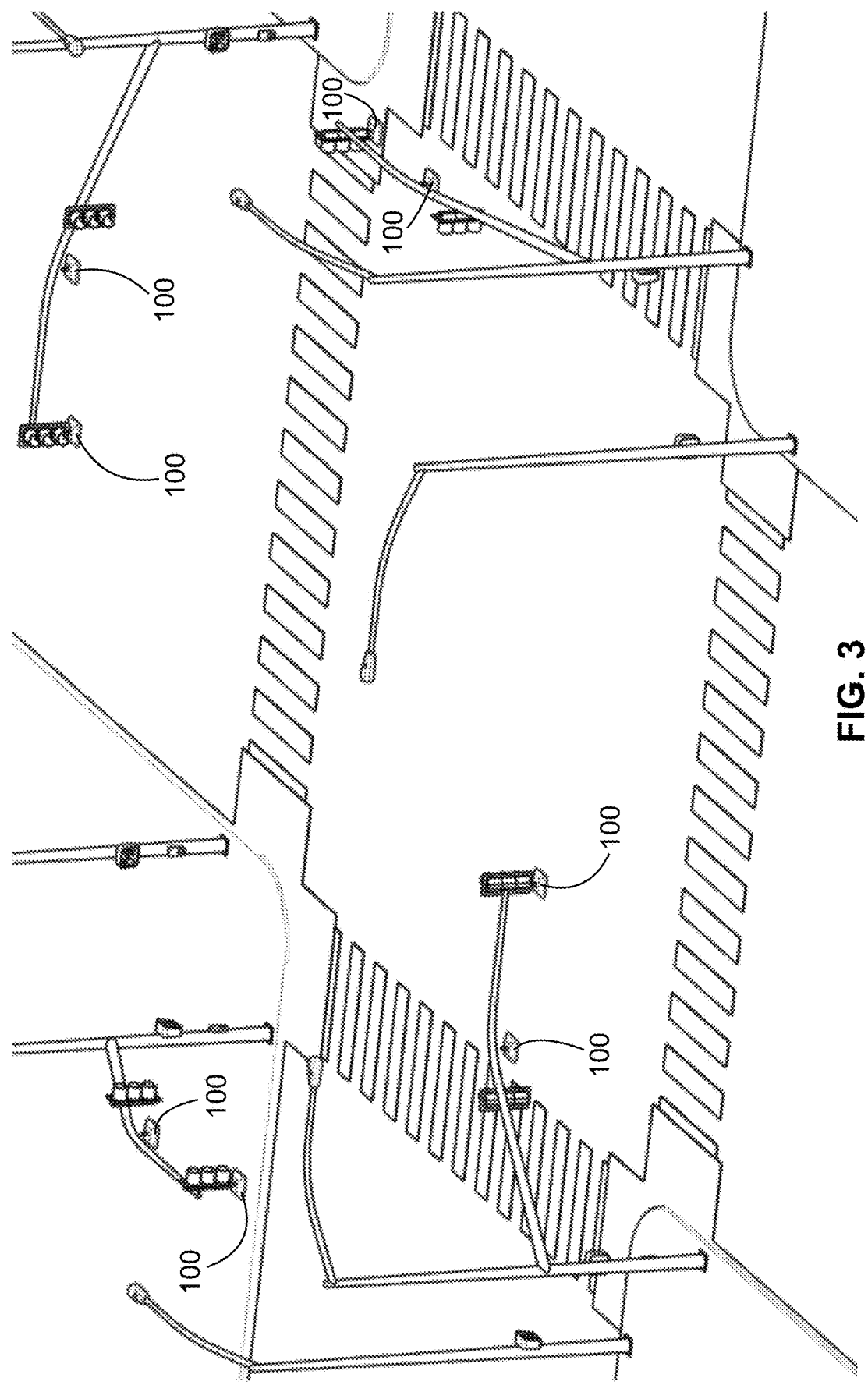
FIG. 3 shows a perspective view of an embodiment of the pedestrian safety lighting device and system as secured to multiple traffic signals in an intersection.
Figure 4:
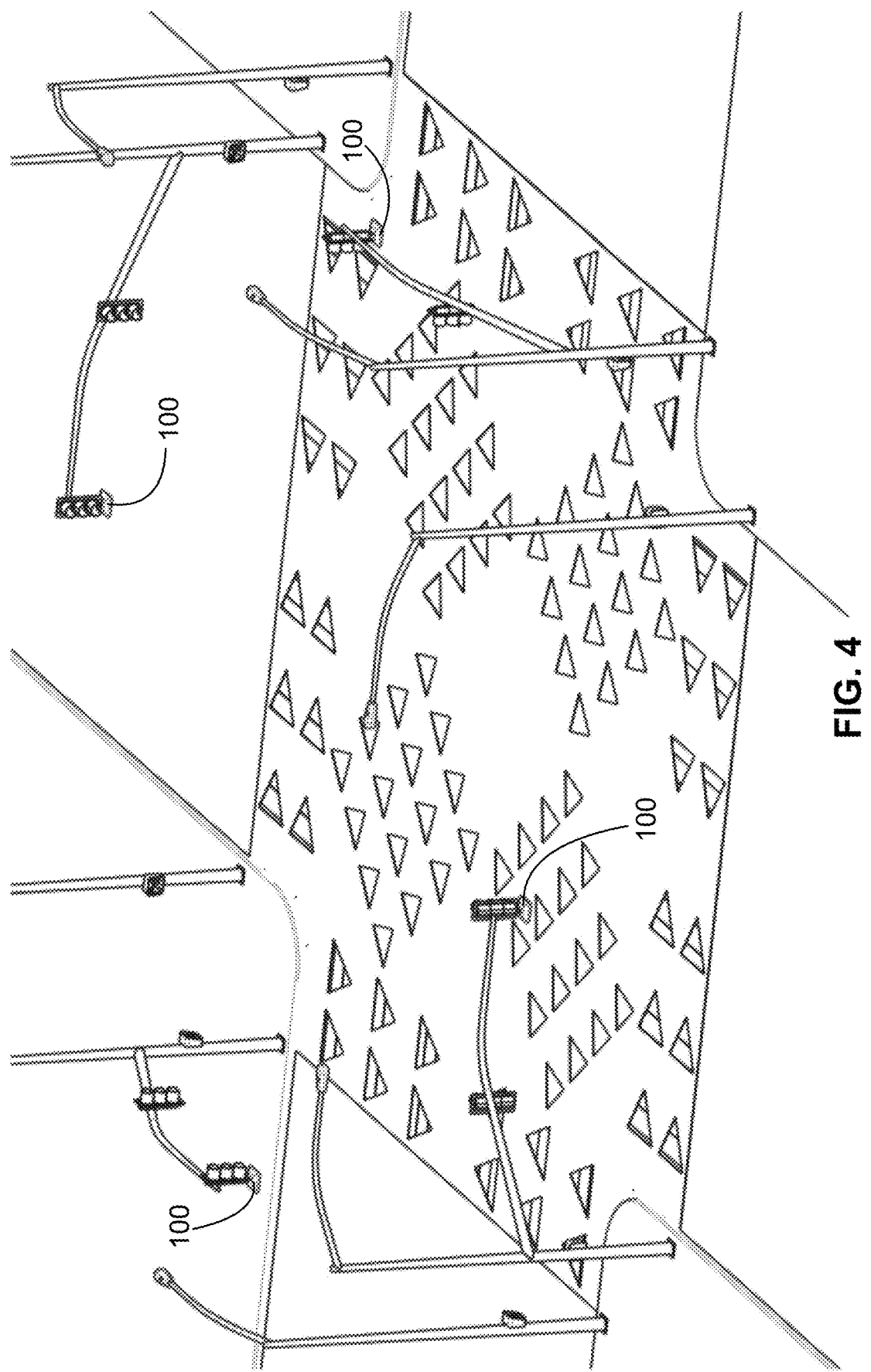
FIG. 4 shows a perspective view of an embodiment of the pedestrian safety lighting device and system as secured to multiple traffic signals in a scramble intersection.

In some embodiments, and as shown in FIG. 3, the device 100 may be disposed on each traffic signal of an intersection. Moreover, each traffic signal may support more than one device 100 in order to provide adequate and even illumination over the intersection. In other embodiments, wherein the intersection may comprise a scramble crosswalk, as shown in FIG. 4, the system may comprise more than one device 100, which may be disposed along each traffic signal at an intersection for a total of four devices 100. In such an embodiment, light from the light source may be projected in a triangular fashion. Moreover, the light may be projected so as to display stationary or moving arrows or other symbols. Indeed, light may be projected from the light source so as to project messages or symbols relating to, for instance, current traffic flow conditions. In preferred embodiments, light from the light source may be projected so as to illuminate pedestrians on multiple sides.

In certain exemplary embodiments, the housing 110 may be formed out of folded sheet metal, an aluminum extrusion, or folded or injection-molded plastic. In other embodiments, the housing 110 may be die-cast out of magnesium, zinc, brass, copper, lead, pewter, tin, steel, and alloys thereof. Of course, one of ordinary skill in the art will recognize the housing 110 may be formed out of any other material suitable for withstanding outdoor conditions. Further, the housing 110 may have optional sealing elements to protect elements contained therein, such as the light source or the power source, from the environment.

Figure 5:
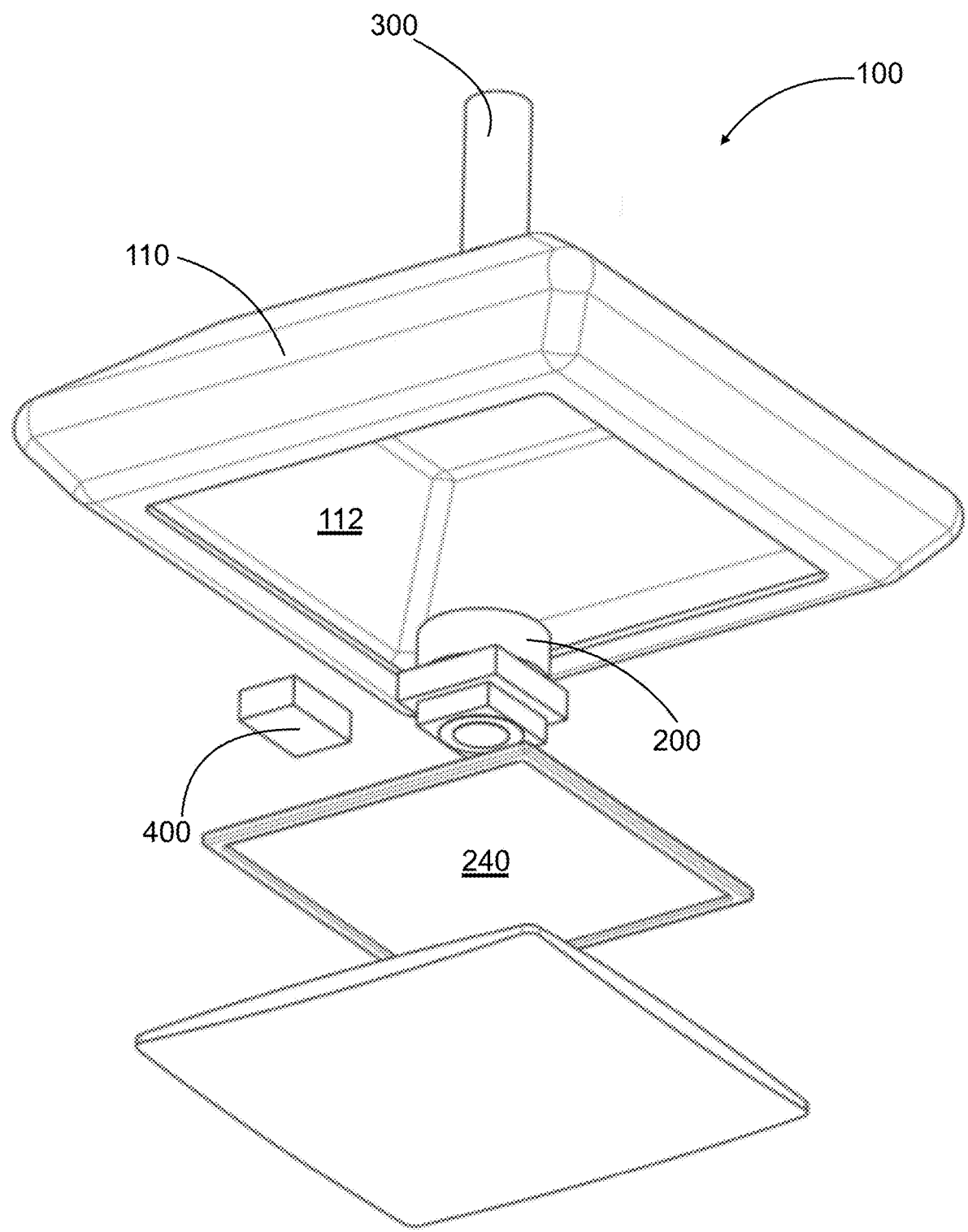
FIG. 5 shows an exploded view of the pedestrian safety lighting device and system in accordance with one exemplary embodiment of the invention.
Figure 6:
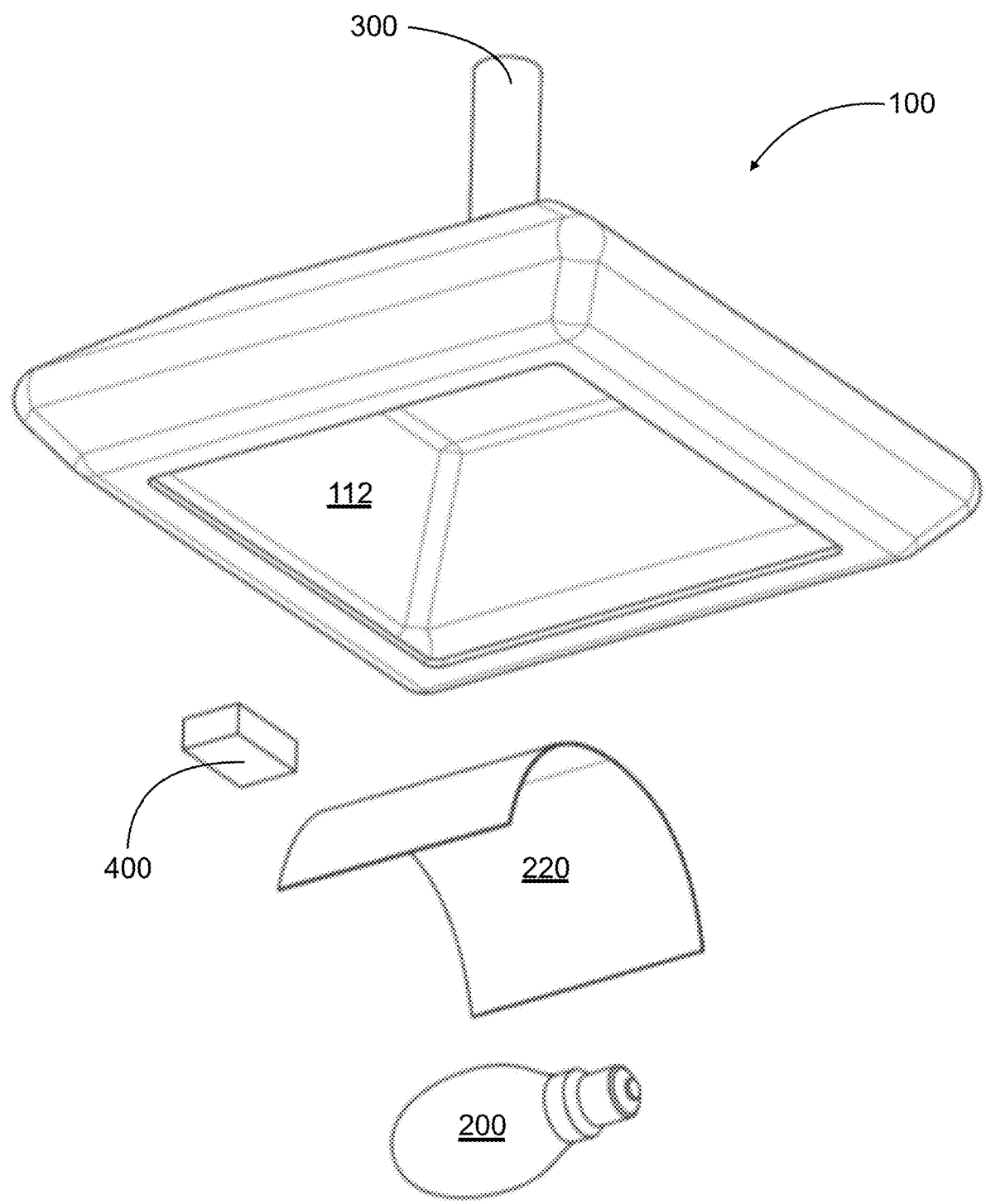
FIG. 6 shows an exploded view of the pedestrian safety lighting device and system in accordance with one exemplary embodiment of the invention.

As noted above, in some exemplary embodiments, the light source may be disposed along the interior surface 112 of the housing 110. In some embodiments, and as shown in FIG. 5, the light source 200 may comprise one or more light emitting diodes (LEDs). As shown in FIG. 6, the light source may alternatively comprise a metal halide lamp. In such embodiments, the pedestrian safety lighting device 100 may further comprise a light directing element 220, such as a reflector or a light guide. The light directing element 220 may be coupled to the light source 200 to redirect light produced by the light source toward the direction of the crosswalk or intersection, as desired. The light directing element may be adjusted so as to redirect illumination from the light source as desired. In other embodiments, the light source 200 may comprise a fluorescent bulb, incandescent bulb, halogen bulb, laser diode, or any other light source and/or combination of the same known for use in luminaires may be substituted as the light source 200 in embodiments of the invention.

Turning attention back to FIG. 5, the pedestrian safety lighting device 100 may further comprising a light processing element 240 configured to modify the color and intensity of light emitted by the light source 200. In particular, the light processing element 240 may display varying colors associated with varying phases of the pedestrian priority timeline. For instance, the light processing element 240 may project light so as to appear yellow in color, thereby indicating to a pedestrian the imminent expiration of pedestrian priority. In another instance, the light processing element 240 may shift to appear red in color, signaling to a pedestrian the end of pedestrian priority and the need to extricate themselves from the roadway. Virtually any other color may be produced by the light processing element 240 through modulation of light emitted by the light source 200.

As depicted in FIG. 5, the light processing element may comprise a liquid crystal display (LCD) screen 240. The LCD screen 240 may be disposed below the light source 200 and may be capable of filtering the light in order to modify the resulting light projection. For instance, the LCD screen 240 may modify the light from the light source 200 so as to project an image or a message onto the crosswalk, intersection, or a portion thereof. Moreover, the LCD screen 240 may project the image or message constantly for a set period of time (i.e. during the time of pedestrian priority). In other embodiments, the LCD screen 240 may project the image or message in pulses or as a progressive roll-out onto a desired area. One of ordinary skill in the art will understand the LCD screen 240 may be operative to provide other optic effects onto the roadway.

Figure 7:
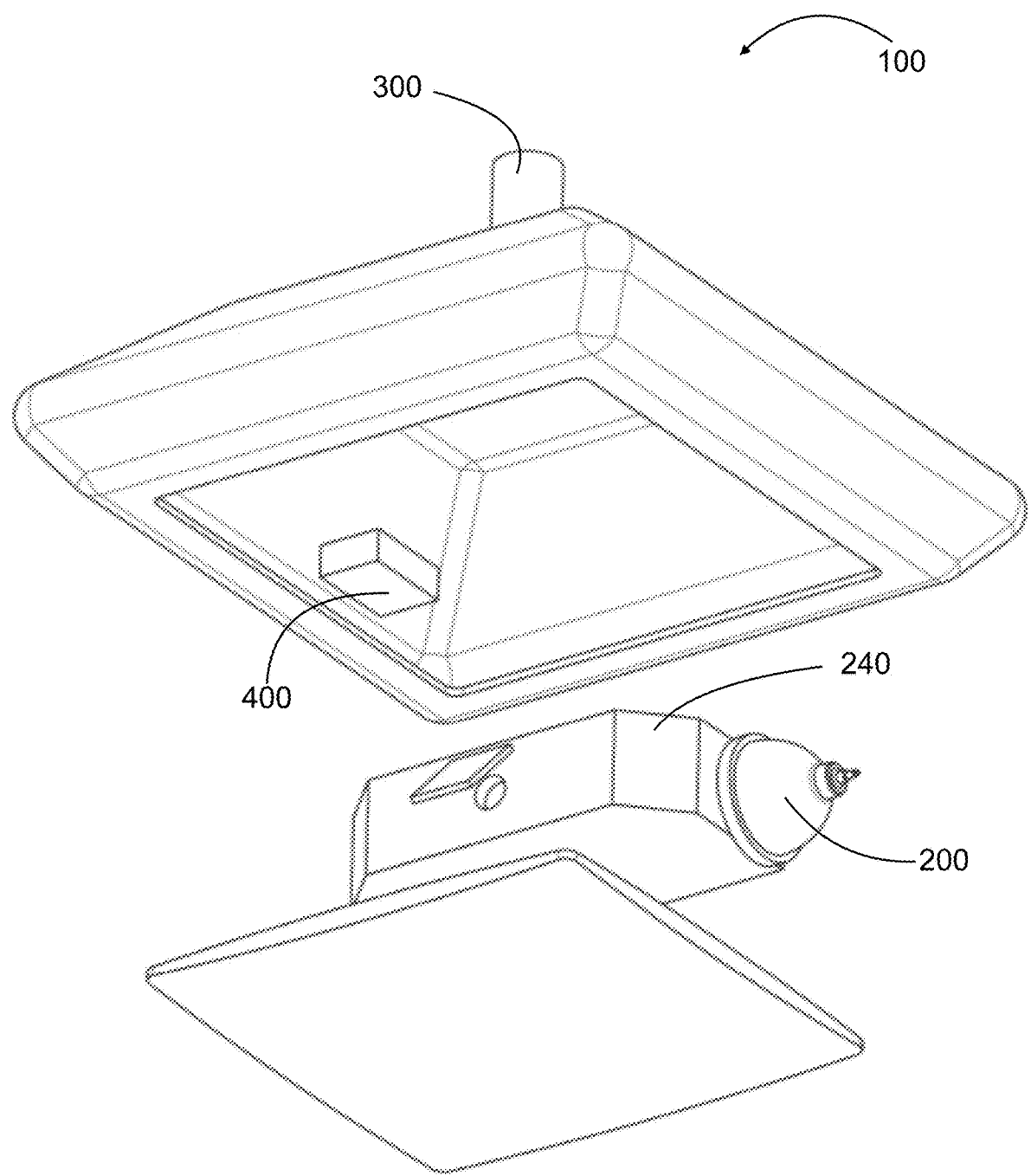
FIG. 7 shows an exploded view of the pedestrian safety lighting device and system in accordance with one exemplary embodiment of the invention.
Figure 8:
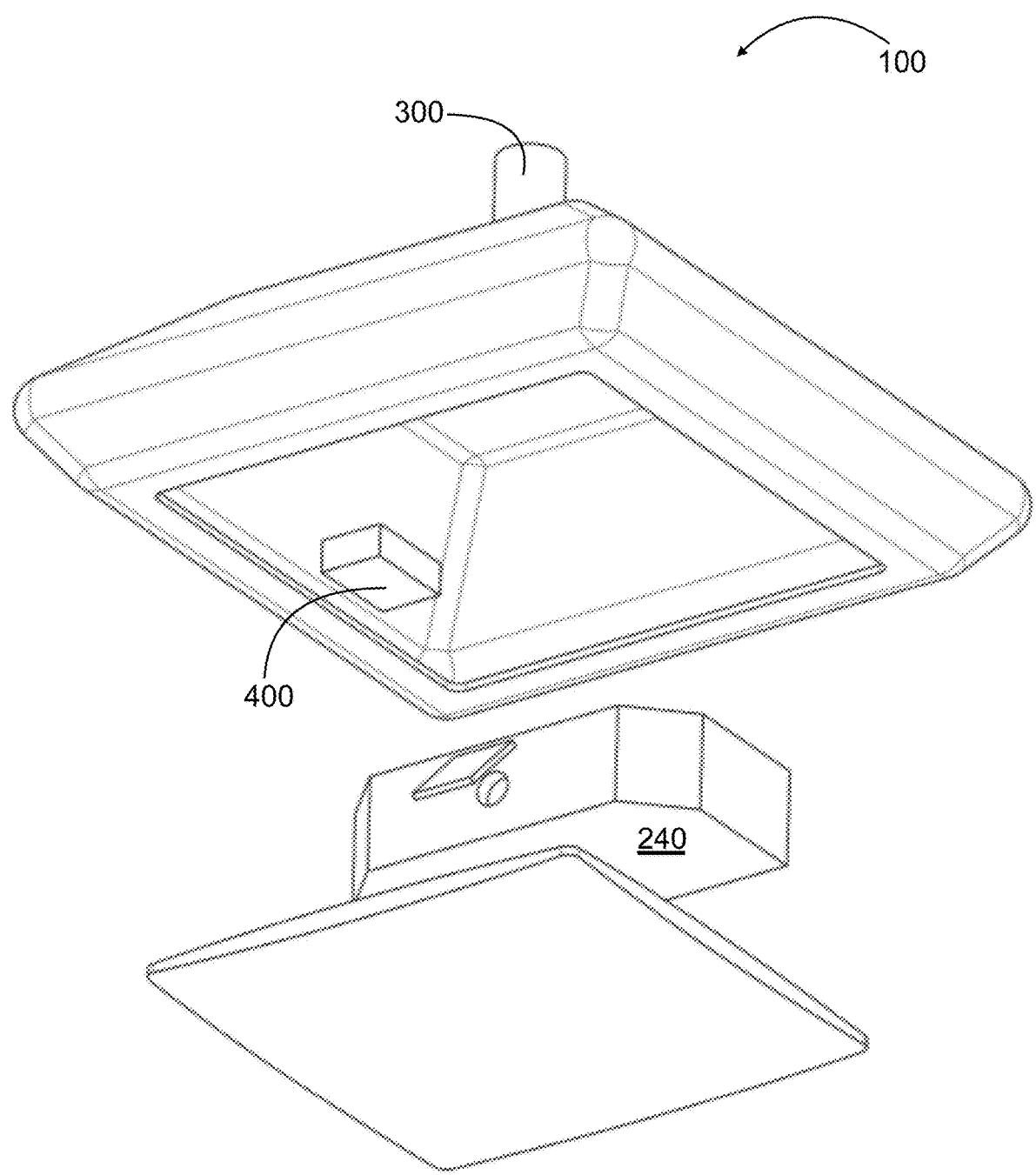
FIG. 8 shows an exploded view of the pedestrian safety lighting device and system in accordance with one exemplary embodiment of the invention.
Figure 9:
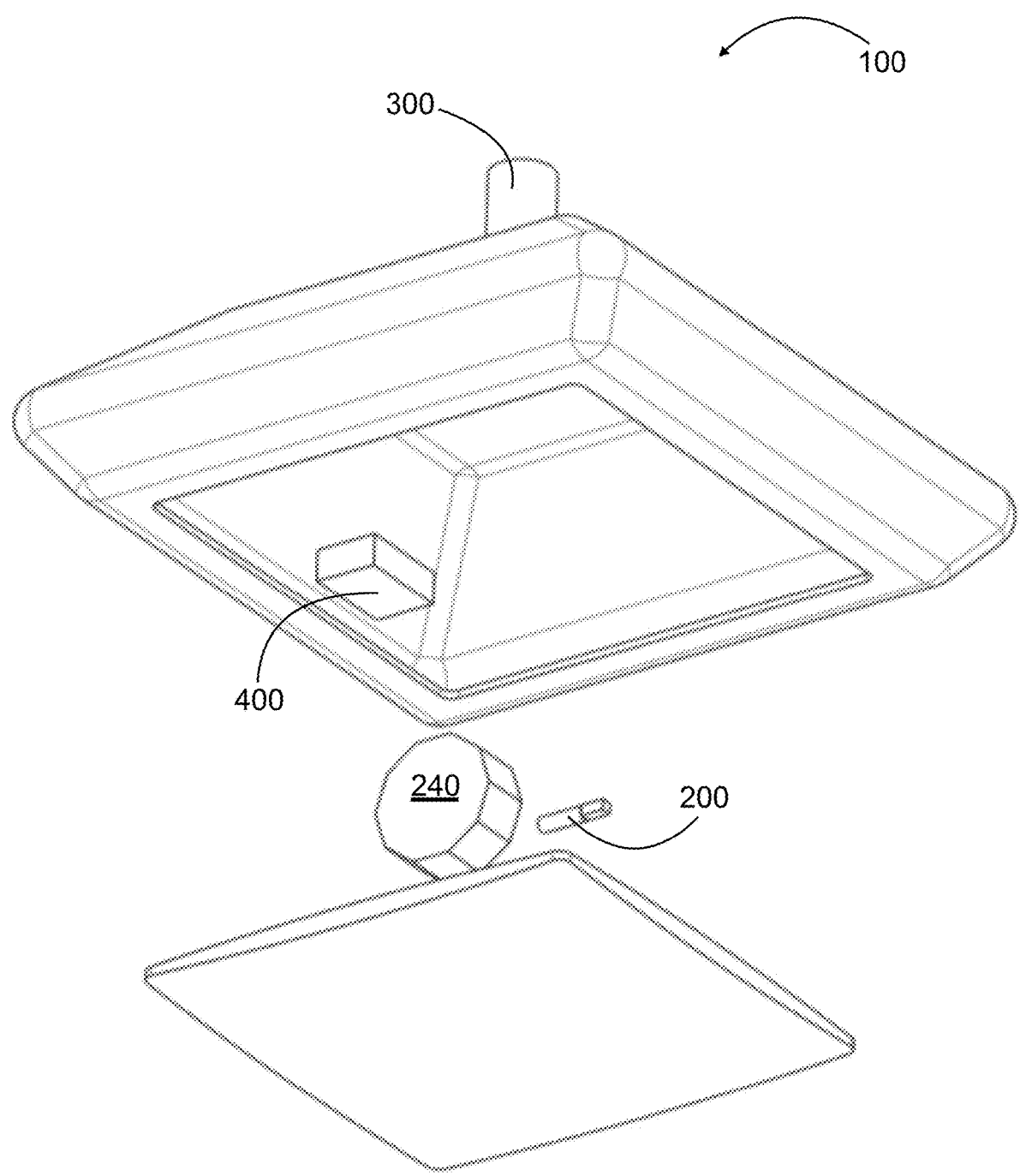
FIG. 9 shows an exploded view of the pedestrian safety lighting device and system in accordance with one exemplary embodiment of the invention.
Figure 10:
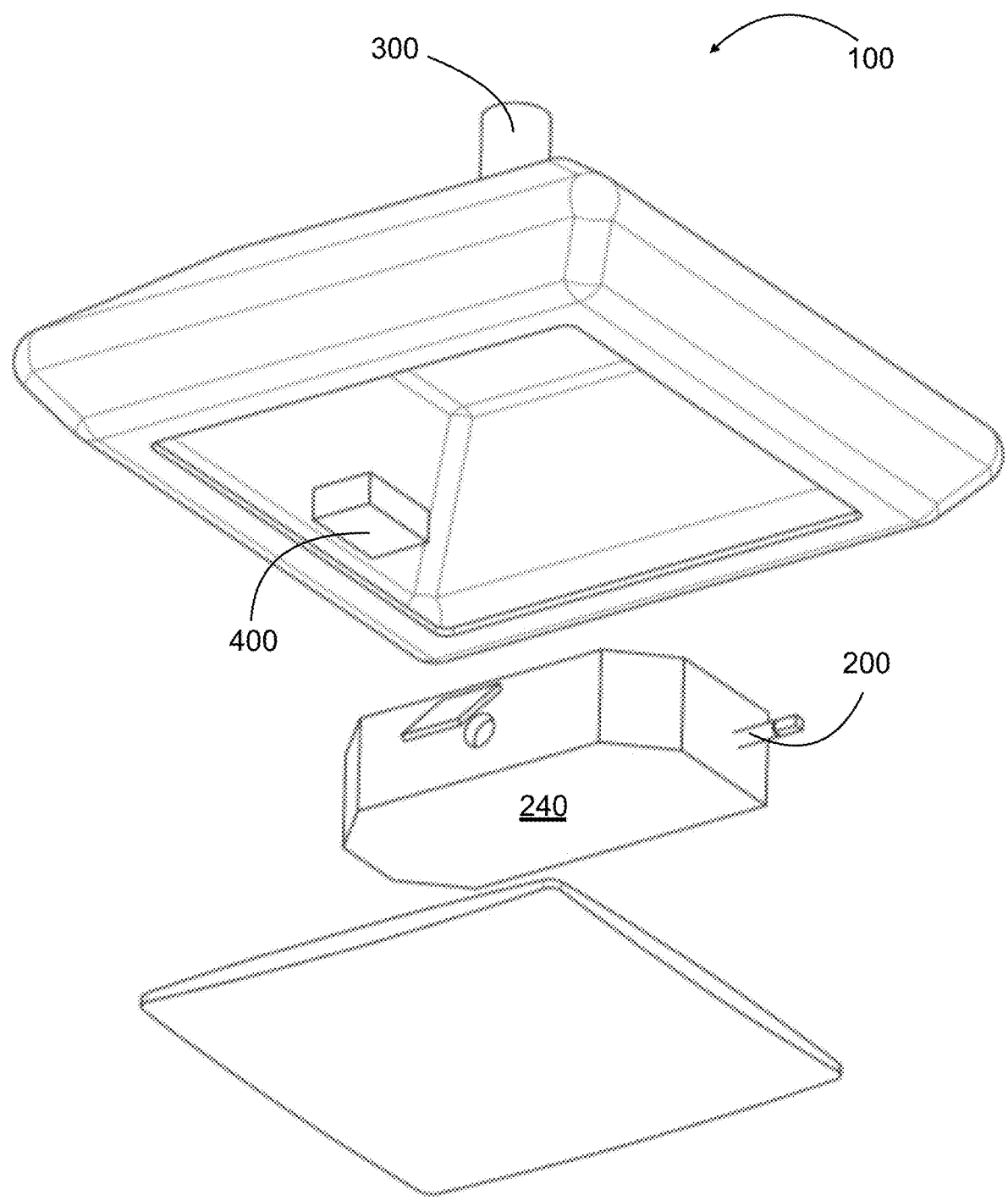
FIG. 10 shows an exploded view of the pedestrian safety lighting device and system in accordance with one exemplary embodiment of the invention.
Figure 11:
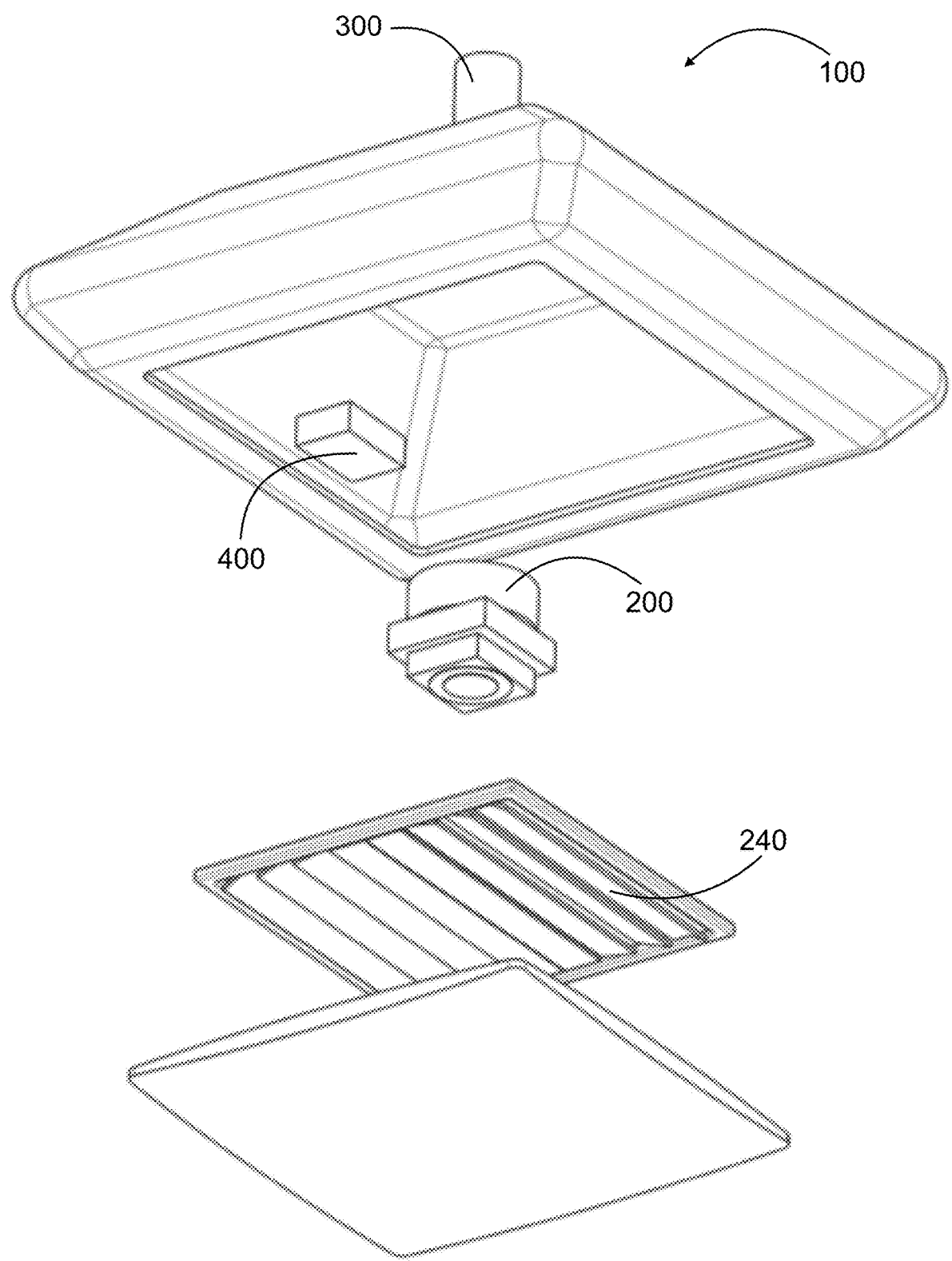
FIG. 11 shows an exploded view of the pedestrian safety lighting device and system in accordance with one exemplary embodiment of the invention.
Figure 12:
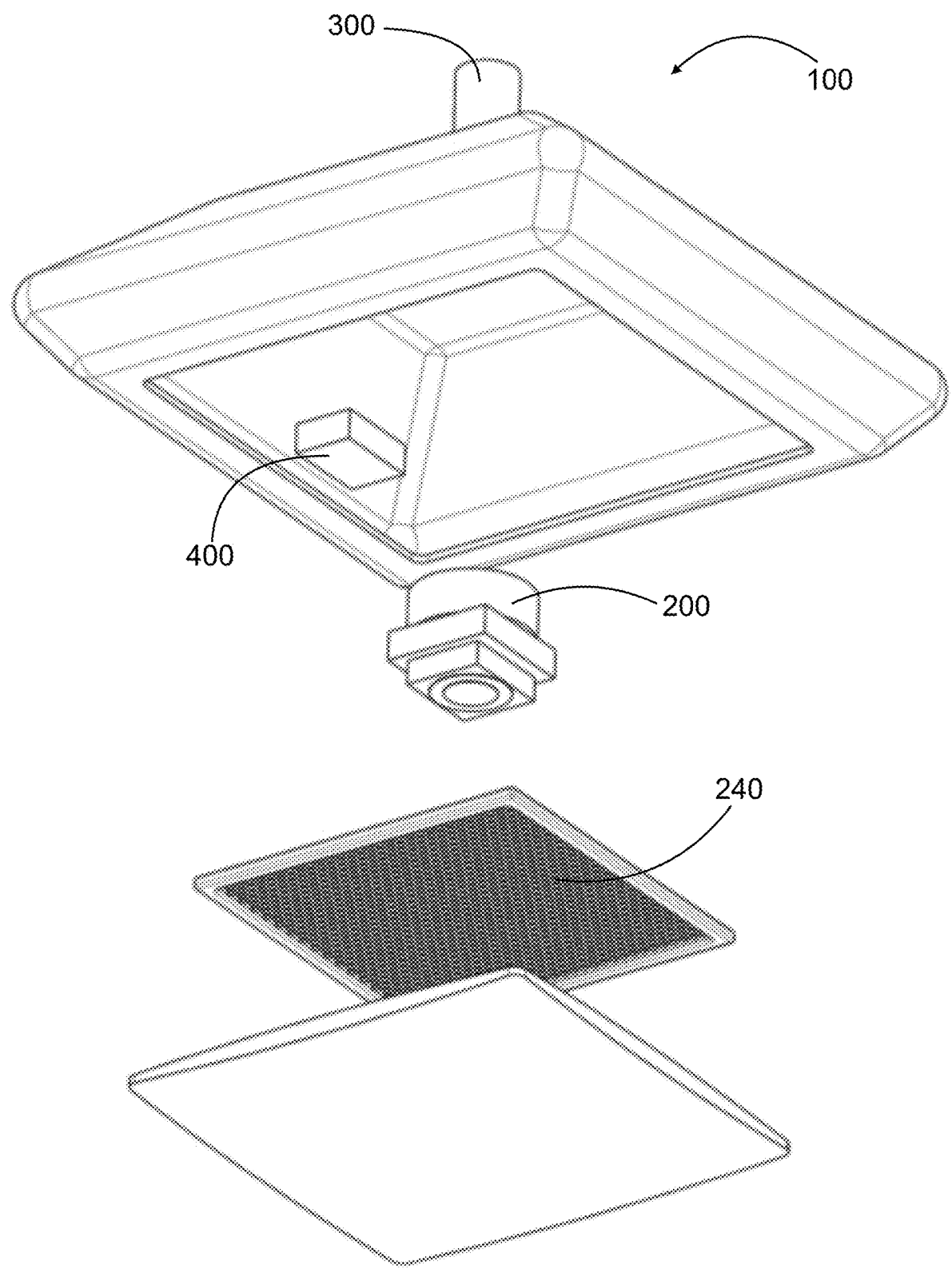
FIG. 12 shows an exploded view of the pedestrian safety lighting device and system in accordance with one exemplary embodiment of the invention.
Figure 13:
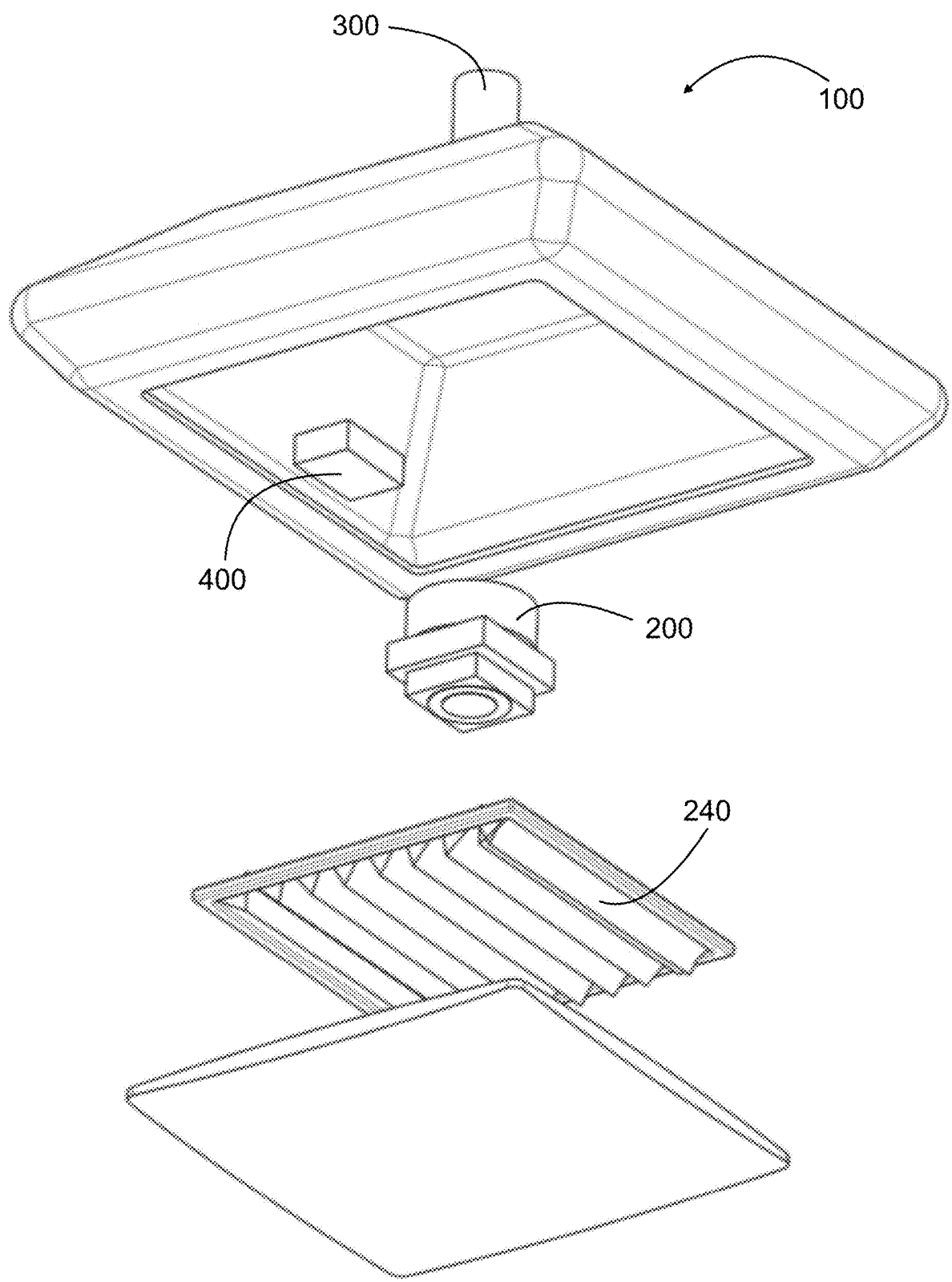
FIG. 13 shows an exploded view of the pedestrian safety lighting device and system in accordance with one exemplary embodiment of the invention.

In alternate embodiments, the light processing element 240 may utilize digital light processing, a digital micromirror device (DMD), or cross dichroic prisms. One of ordinary skill in the art will understand that various other types of light processing elements 240 may be adapted in accordance with this invention depending on the type of light source 200 utilized. Specifically, as shown in FIG. 7, the light source 200 may comprise an ultra-high performance (UHP) bulb and the light processing element 240 may comprise any of the above-mentioned image processors. In another embodiment shown in FIG. 8, the light source (obscured from view) may comprise red, green, and blue (RGB) LEDs and the light processing element 240 may comprise any of the above-mentioned image processors. In yet another embodiment illustrated in FIGS. 9-10, the light source 200 may comprise a laser light projector and the light processing element 240 may comprise either a spinning mirror carousel (as shown in FIG. 9) or an internal image processor (as shown in FIG. 10). Further, as shown in FIG. 11-13, in alternate embodiments wherein the light source 200 comprises one or more LEDs, the light processing element 240 may comprise a louvered image processor (as shown in FIG. 11), a kinegram film image processor (as shown in FIG. 12), or a mirrored image processor (as shown in FIG. 13).

As noted above, the pedestrian safety lighting device 100 may further comprise the communication means 300, which may be configured to receive external data from and transmit internal data to at least one external source. The external source may comprise a traffic signal, a data center, a vehicle capable of receiving such internal data from the device 100, a smartphone, or another device 100 located within the same vehicular intersection. The communication means 300 may be wired or wireless. Specifically, the communication means 300 may comprise near-field communications, microwave links, Bluetooth, IEEE 802.11 wireless communications, or cellular communications such as Global System for Mobile Communications (GSM).

In some embodiments, the communication means 300 may be operative to be subservient to existing traffic and pedestrian signals at a vehicular intersection. In such an embodiment, the communication means 300 may receive external data, such as a change in the traffic light or a change in the pedestrian signal, and evaluate the external data to selectively illuminate the light source 200. For instance, if the pedestrian signal changes from "DON'T WALK" to "WALK", the communication means 300 may illuminate the light source 200 so as to project light upon the crosswalk or intersection, as the case may be. As another example, if the traffic signal changes from green to yellow, the communication means 300 may selectively illuminate the light source 200 in a pulsating fashion or so as to project other optic effects, as discussed above, to indicate to a pedestrian the imminent expiration of pedestrian priority.

In other embodiments, the communication means 300 may be operative to act domineering over existing traffic and pedestrian signals at an intersection. In such an embodiment, the communication means 300 may compare historical internal data and external data and transmit internal data to the traffic signal or pedestrian signal so as to control the same. In particular, the communication means 300 may determine the quantity of which a pedestrian or pedestrians activate a pedestrian signal and may cause the traffic signal to progressively change from green to yellow to red and upon the traffic signal changing to green, illuminate the light source 200. In a domineering configuration, the communication means 300 may be further operative to transmit internal data to other traffic intersections to coordinate the activities of proximate (or even distant) intersections.

In yet other embodiments, the communication means 300 may be operative to communicate with data centers, which may comprise any interested third party, such as research institutions, insurance companies, or the government. The communication means 300 may collect internal data and transmit the internal data to the data center to notify of emergency situations, for instance. In another embodiment, the communication means 300 may transmit internal data to the data centers in order to improve overall traffic flow amongst nearby intersections. In still other embodiments, the communication means 300 may evaluate environmental and traffic conditions and transmit internal data to other intersections or data centers to alter traffic signal timing. The communication means 300 may further communication internal data relating to environmental and traffic conditions to traffic signals within the same intersection. In those embodiments, the communication means 300 may initiate a delay between traffic signals, that is, the time between a red light being illuminated in one direction and a red light changing to green in the crossing direction may be extended.

Figure 14:
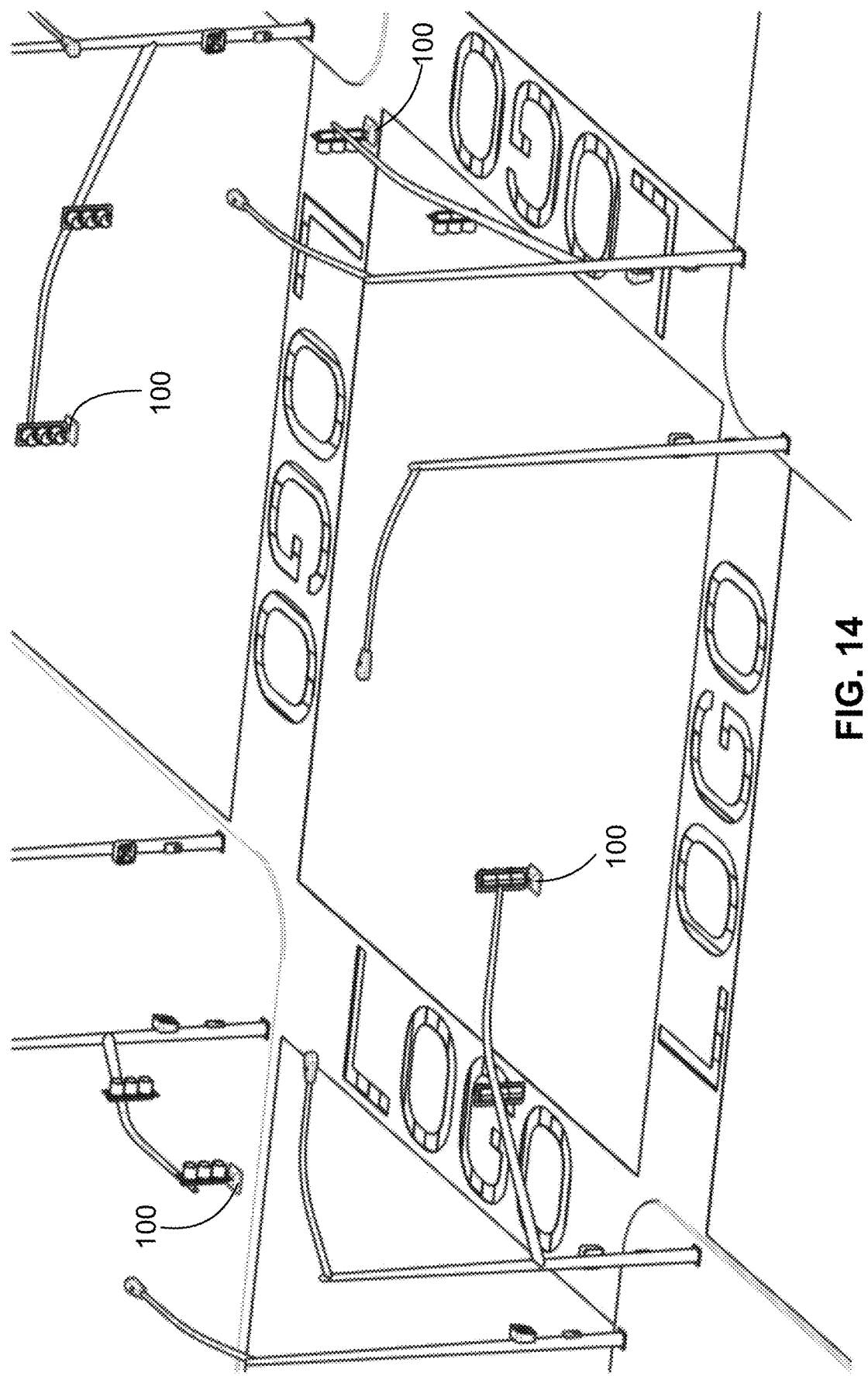
FIG. 14 shows a perspective view of an embodiment of the pedestrian safety lighting device and system as secured to multiple traffic signals in an intersection.

In yet other embodiments, and as shown in FIG. 14, the communication means 300 may receive data from the data center in the form of advertisements. In particular, the communication means 300 may receive data related to third party advertisements from the data center and light from the light source may be projected so as to display a message or logo, for example. The communication means 300 may further time the projection of the advertisement so as to display the message or logo either immediately prior to pedestrian priority or immediately prior to the expiration of pedestrian priority. Moreover, the communication means 300 may further transmit such advertisements to pedestrians or drivers via a carried smartphone or in-vehicle displays.

The pedestrian safety lighting device 100 may also have the power source 400 configured to electrically couple the light source 200 to an external power supply. As illustrated in the Figures, the power source 400 may comprise a driver disposed within the interior cavity 150. In alternative embodiments, the power source 400 may be placed outside the device 100. While a driver is illustrated and described, a person of ordinary skill in the art will recognize other means for electrically coupling the light source 200 to an external power supply based on the type of light source 200 utilized.

Figure 15:
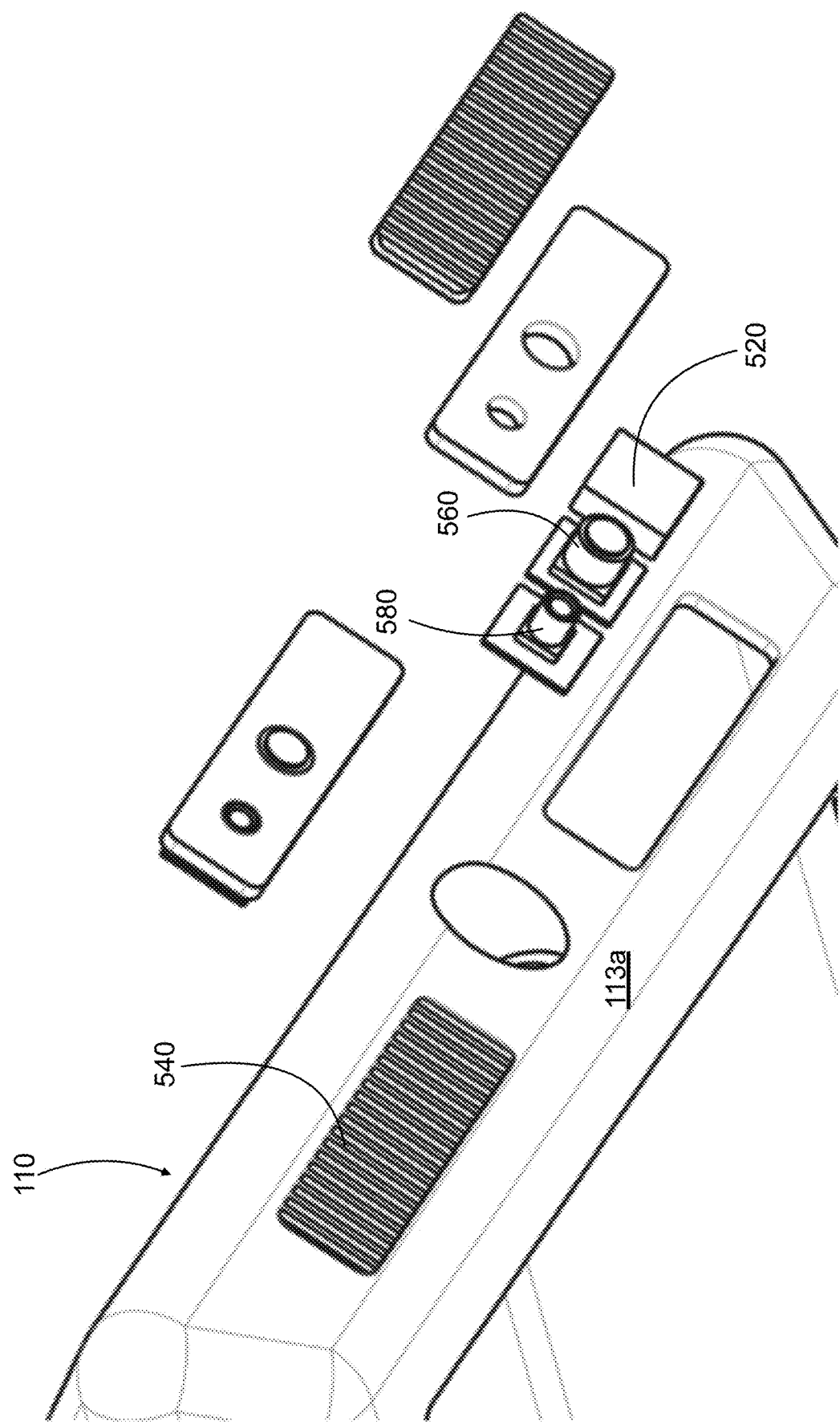
FIG. 15 shows an exploded view of the pedestrian safety lighting device and system in accordance with one exemplary embodiment of the invention.

With attention now to FIG. 15, in some embodiments, the pedestrian safety lighting device may further comprise additional elements such as one or more sensors 520 one or more speakers 540 one or more cameras 560 and one or more microphones 580 The one or more sensors 520 may include, but are not limited to, one or more proximity sensors weather sensors, and ambient lighting sensors.

Figure 16:
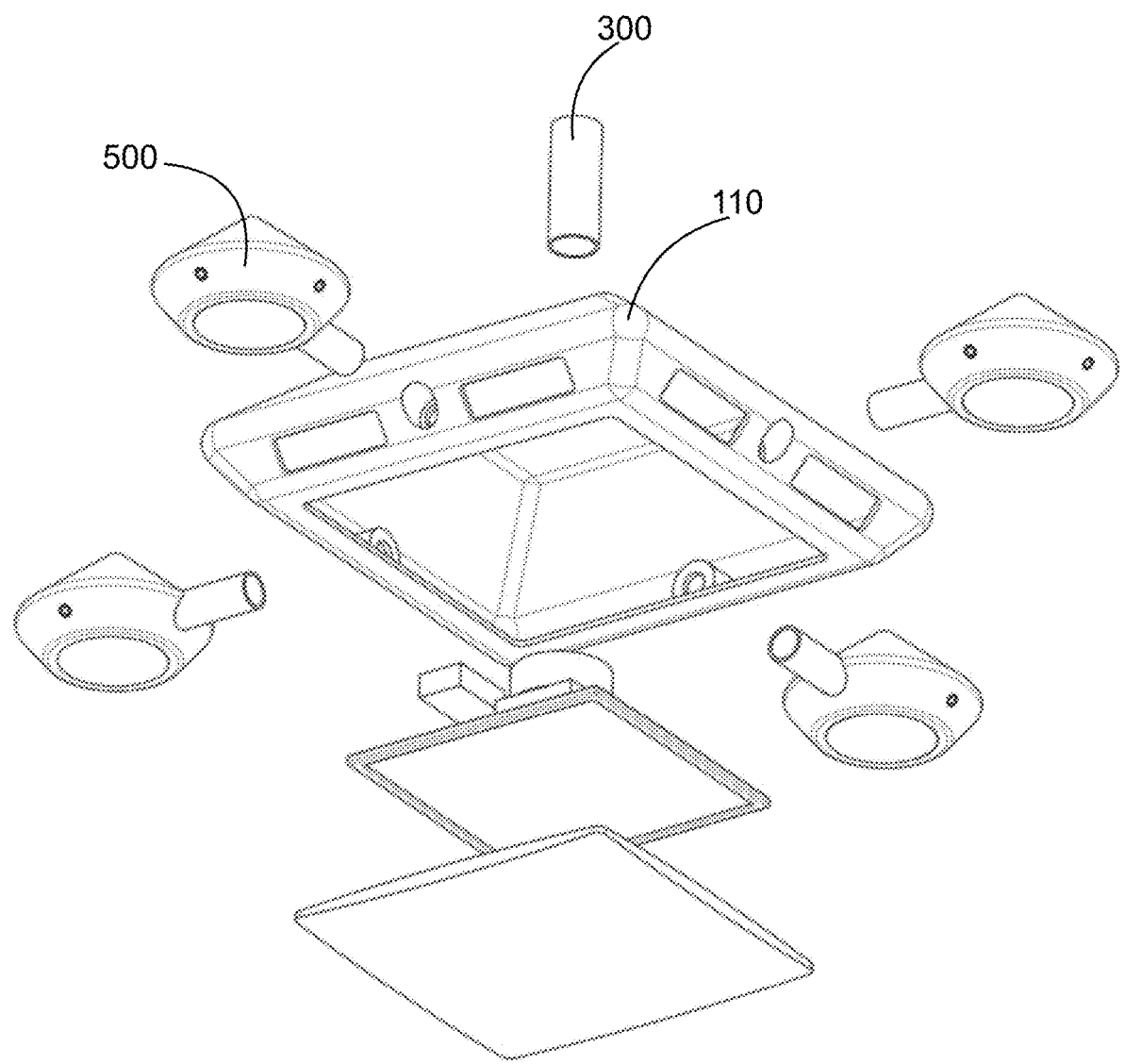
FIG. 16 shows an exploded view of the pedestrian safety lighting device and system in accordance with one exemplary embodiment of the invention.

In certain embodiments, and as shown in FIG. 15, these additional elements discussed above may be disposed in or along the housing 110. By way of example, and not limitation, the proximity sensors, the ambient lighting sensors, and the weather sensors may be disposed along one or more of the first, second, third, and fourth edges 113a-d (the second, third, and fourth edges 113b-d being obscured from view in FIG. 15) of the housing 110. In other embodiments, the additional elements may be removably attachable to the housing 110. As an example, and as illustrated in FIG. 16, a removable accessory 500 may securably mount to the housing 110. In such embodiments, the removable accessory 500 may secure and house the additional elements mentioned above. Moreover, different configurations and combinations of the aforementioned accessories may be utilized to advance the objectives of the user and meet safety demands of a particular location.

In embodiments wherein the device comprises one or more proximity sensors, the proximity sensors may be configured to detect the presence and position of an object within the vehicular intersection. In such embodiments, the proximity sensor may comprise an ultrasonic sensor, a light detection and ranging (LIDAR) sensor, a passive infrared (PIR) sensor, infrared (IR) sensor, or radio frequency identification (RFID) technology. By way of example, in embodiments wherein the proximity sensor comprises a LIDAR sensor, the device may provide speed and locational data for traffic control, accident evidence, law enforcement, pedestrian awareness, congestion pricing, and autonomous vehicle support. In such an embodiment, if a vehicle or pedestrian is approaching the intersection at an inopportune moment, the device may be capable of flashing a warning light or sending some other signal to the offending target.

Moreover, the vehicle itself may be adapted to receive in-vehicle notifications from the proximity sensor, such as flashing of inboard lights or vibration of the steering wheel. Similarly, a pedestrian carrying a smartphone or RFID device may receive notifications from the proximity sensor, such as a flashing light, push notification, or vibration.

In embodiments wherein the device comprises the ambient lighting sensors, the ambient lighting sensors may comprise a photoresistor configured to detect the presence or absence of light and to measure light intensity. Moreover, the ambient lighting sensor may be coupled to the communication means 300 to adjust the intensity of light emitted from the light source to compensate for poor visibility. In embodiments wherein the device may have weather sensors, the weather sensors may detect and measure weather conditions such as temperature, precipitation, humidity, and barometric pressure.

The speakers 540 may be configured to emit a noise and may thereby provide awareness to pedestrians and vehicles of pedestrian priority or lack thereof. In another instance, the speakers 540 may indicate imminent pedestrian priority expiration, such as through a countdown or music. Moreover, the speakers 540 may emit a siren, a bell, a chime, or other signal capable of being audibly detected.

In some embodiments, the cameras 560 may be configured to record real time video. For instance, the cameras 560 may capture images of pedestrians, vehicles, license plates, or even accident evidence. Moreover, the cameras 560 may be operative to capture an image upon a triggering event, such as a vehicle running a red light, amber alert tracking, suspect vehicle tracking, or hazardous roadway conditions. In some embodiments, the cameras 560 may transmit captured images or videos to the communication means 300, which may, in turn, transmit internal data relating to the same to an external source, such as those mentioned above.

In embodiments wherein the device may further comprise one or more microphones 580, which may be configured to receive auditory input. And convert the auditory input into an electrical signal. In certain embodiments, the microphones 580 may be adapted to report emergency situations to fire, paramedic, and police, for instance. Furthermore, the microphones 580 may enhance situational knowledge otherwise unattainable by the one or more cameras 560 and the proximity sensors 520, such as detection of a gunshot.

The above-described embodiments are examples of some embodiments of the present invention. Many variations and modifications may be made to the above-described embodiments without departing from the principles of the present disclosure. All such modifications and variations are intended to be included herein within the scope of this disclosure and protected by the following claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

CONCLUSIONS, RAMIFICATIONS, AND SCOPE

While certain embodiments of the invention have been illustrated and described, various modifications are contemplated and can be made without departing from the spirit and scope of the invention. Accordingly, it is intended that the invention not be limited, except as by the appended claim(s).

The teachings disclosed herein may be applied to other systems, and may not necessarily be limited to any described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions and concepts of the various references described above to provide yet further embodiments of the invention.

Particular terminology used when describing certain features or aspects of the invention should not be taken to imply that the terminology is being refined herein to be restricted to any specific characteristics, features, or aspects of the pedestrian safety lighting device and system with which that terminology is associated. In general, the terms used in the following claims should not be constructed to limit the pedestrian safety lighting device and system to the specific embodiments disclosed in the specification unless the above description section explicitly define such terms. Accordingly, the actual scope encompasses not only the disclosed embodiments, but also all equivalent ways of practicing or implementing the disclosed system and apparatus. The above description of embodiments of the pedestrian safety lighting device and system is not intended to be exhaustive or limited to the precise form disclosed above or to a particular field of usage.

While specific embodiments of, and examples for, the system and apparatus are described above for illustrative purposes, various equivalent modifications are possible for which those skilled in the relevant art will recognize.

While certain aspects of the system and apparatus disclosed are presented below in particular claim forms, various aspects of the present invention are contemplated in any number of claim forms. Thus, the inventor reserves the right to add additional claims after filing the application to pursue such additional claim forms for other aspects of the pedestrian safety lighting device and system.

What is claimed is:

1. A pedestrian safety lighting device, comprising:
   a housing configured to securably mount to a traffic signal device;
   at least one light source disposed along an interior surface of the housing;
   a communication means for:
   (i) receiving external data from at least one external source, the external data indicating information about an output signal from the traffic signal device or another indicator to be displayed on a crosswalk or an intersection where the pedestrian safety lighting device is installed;
   (ii) selectively illuminating the at least one light source based on the received external data;
   (iii) generating and transmitting internal data from the pedestrian safety lighting device to the at least one external source;
   at least one light directing element disposed along the interior surface of the housing, and different from the at least one light source, and configured to direct light, emitted from the at least one light source, toward the crosswalk or the intersection based on both the received external data and the generated and transmitted internal data;
   a power source configured to energize the pedestrian safety lighting device; and
   at least one light processing element, coupled to the at least one light directing element, configured to modify color and intensity of the directed light emitted by the at least one light source to the crosswalk or intersection.

2. The pedestrian safety lighting device of claim 1, wherein the at least one light directing element comprises a reflector.

3. The pedestrian safety lighting device of claim 1, wherein the at least one light processing element comprises a liquid crystal display screen.

4. The pedestrian safety lighting device of claim 1, wherein the at least one external source comprises the traffic signal device or another traffic signal device.

5. The pedestrian safety lighting device of claim 1, wherein the at least one external source comprises a data center.

6. The pedestrian safety lighting device of claim 1, wherein the at least one external source comprises a vehicle capable of receiving the internal data from the pedestrian safety lighting device.

7. The pedestrian safety lighting device of claim 1, wherein the at least one external source comprises a smartphone.

8. The pedestrian safety lighting device of claim 1, further comprising one or more proximity sensors configured to detect an object's presence and position.

9. The pedestrian safety lighting device of claim 1, further comprising one or more weather sensors configured to measure temperature, precipitation, humidity, and barometric pressure.

10. The pedestrian safety lighting device of claim 1, further comprising one or more ambient lighting sensors and operative to communicate with the communication means to adjust light intensity from the at least one light source to dynamically compensate for poor visibility and nighttime operating conditions.

11. The pedestrian safety lighting device of claim 1, further comprising one or more speakers configured to emit a noise.

12. The pedestrian safety lighting device of claim 1, further comprising one or more cameras configured to record real-time video.

13. The pedestrian safety lighting device of claim 1, further comprising one or more microphones configured to receive auditory input.

14. A pedestrian safety lighting device, comprising:
   a housing configured as a stand-alone structure at a traffic intersection;
   at least one light source disposed along an interior surface of the housing;
   a communication means for
   (i) receiving external data from at least one external source, the external data indicating information about an output signal from the traffic signal device or another indicator to be displayed on a crosswalk or an intersection where the pedestrian safety lighting device is installed;
   (ii) selectively illuminating the at least one light source based on the received external data;
   (iii) generating and transmitting internal data from the pedestrian safety lighting device to the at least one external source;
   at least one light directing element disposed along the interior surface of the housing, and different from the at least one light source, and configured to direct light, emitted from the at least one light source, toward the crosswalk or the intersection based on both the received external data and the generated and transmitted internal data;

a power source configured to energize the pedestrian safety lighting device; and at least one light processing element, coupled to the at least one light directing element, configured to modify color and intensity of the directed light emitted by the at least one light source to the crosswalk or intersection.

15. A pedestrian safety lighting system, comprising:

a housing operative to secure at least one light source, the at least one light source being operative to illuminate a crosswalk or traffic intersection;

a communication means operative to (i) receive external data from at least one external source, the external data indicating information about an output signal from the traffic signal device or another indicator to be displayed on a crosswalk or an intersection where the pedestrian safety lighting device is installed;

(ii) selectively illuminate the at least one light source based on the received external data;

(iii) generate and transmit internal data;

the at least one external source operative to transmit external data to and receive internal data from the communication means;

at least one light directing element, different from the at least one light source, and configured to direct illumination from the at least one light source toward the crosswalk or the traffic intersection based on both the received external data and the generated and transmitted internal data;

a power source operative to supply power to the system; and at least one light processing element coupled to the at least one light directing element, configured to modify color and intensity of the directed light emitted by the at least one light source to the crosswalk or intersection.

16. The pedestrian safety lighting system of claim 15, wherein the at least one external source comprises the traffic signal device or another traffic signal device.

17. The pedestrian safety lighting system of claim 15, wherein the at least one external source comprises a data center.

* * * * *